United States Patent [19]

Nguyen et al.

[11] Patent Number: 5,120,558

[45] Date of Patent: Jun. 9, 1992

[54] PROCESS FOR THE SUPERCRITICAL EXTRACTION AND FRACTIONATION OF SPICES

[75] Inventors: Uy Nguyen; David A. Evans; Dietmar J. Berger; Jaime A. Calderon, all of Edmonton, Canada

[73] Assignee: Norac Technologies Inc., Edmonton, Canada

[21] Appl. No.: 694,255

[22] Filed: May 1, 1991

[51] Int. Cl.$^5$ .............................................. A23L 1/00
[52] U.S. Cl. .................................... 426/425; 426/478; 426/655
[58] Field of Search ................ 426/425, 478, 495, 655

[56] References Cited

U.S. PATENT DOCUMENTS

| | | | |
|---|---|---|---|
| 4,123,559 | 10/1978 | Vitzthum et al. | 426/478 |
| 4,490,398 | 12/1984 | Behr et al. | 426/650 |
| 4,985,265 | 1/1991 | Duboc et al. | 426/425 |

OTHER PUBLICATIONS

Stahl et al, Dense Gases for Extraction and Refining, Springer-Verlag, Berlin, 1988.
Lenhard et al, Second International Symposium on Separation Sciences and Technology, Canadian Chem. Eng. Soc. Conf., Hamilton, Ontario, 1989.

Primary Examiner—George Yeung
Attorney, Agent, or Firm—Ridout & Maybee

[57] ABSTRACT

A process for extracting spice to obtain oleoresin and fractionating the oleoresin into fixed and essential oil components is described. The extraction is performed on the ground spice using supercritical fluid carbon dioxide under a pressure of from about 400 bar to about 600 bar and at a temperature of from about 80° C. to about 120° C. A cascading continuous extraction method is preferred. Oleoresin fractions are precipitated from the supercritical fluid at reduced pressures in the ranges 280–380 bar and 100–200 bar at 80°–100° C., while a last fraction is obtained from the non-critical fluid at a pressure of 30–50 bar and a temperature of 0°–30° C.

11 Claims, 4 Drawing Sheets

PROCESS FOR THE SUPERCRITICAL EXTRACTION AND FRACTIONATION OF SPICES

The invention is a process for extracting spices, herbs and other food and beverage related plant materials using supercritical fluid carbon dioxide. The invention includes the fractionation of extracts into, for example, fixed oil components, essential oil and aqueous juice.

In this application, the word "spice" in the singular or plural shall be taken to mean those plant materials used to provide flavoring, aroma or both to foods and beverages. The process of the invention is concerned with the production of spice extracts and the useful fractions of such extracts which have widespread use in the food and beverage industries.

Presently, virtually all commercial spice extraction is carried out by one of two methods. One method, solvent extraction, involves treating a ground dry spice with an organic solvent such as hexane, acetone, methanol, ethanol or methylene chloride. In some cases, whole spice or fresh spice may be used as the raw material. Pursuant to this method, the spice extract is recovered by removal of the solvent, usually by distillation with heat under vacuum. The spice extract recovered in this way is known as an oleoresin. The composition of an oleoresin is affected by the choice of organic solvent used in the extraction, but typically will include phospholipids, oils, waxes, sterols, resins, and a range of non-volatile and volatile compounds which make up much of the aroma and flavor of the original spice. The portion of the oleoresin which can be separated and recovered by aqueous distillation is known as the essential oil.

The other commercial method of spice extraction is the aqueous distillation of the whole or ground, fresh or dried spice using either boiling water or steam. This method recovers only the steam volatile components of the spice; i.e., the essential oil which is high in aroma and flavor compounds.

Many variations of these two methods are possible. The essential oil may be prepared by distillation from the original spice, or by distillation from a previously prepared solvent extracted oleoresin. The oleoresin may be prepared by solvent extraction of the original spice, or by solvent extraction of the residue remaining after steam distillation. In the latter case, the resulting oleoresin contains no essential oil, so it must then be added back to make a complete oleoresin.

With some spices, for example, ginger, cinnamon and pepper, the non-volatile portion of the oleoresin, called the fixed oil, contains pungent compounds that are an important part of the overall flavor profile. With other spices, such as for example, members of the Umbelliferae family (e.g., celery, fennel, caraway, anise, dill, coriander), the fixed oil contains large amounts of plant triglyceride oil which does not possess flavor or aroma properties but does contribute as a carrier for other oil soluble components and also contributes to the physical properties of the oleoresin. Other important functional components of the fixed oil include natural antioxidant compounds, colorants such as carotenoid and xanthophyll pigments, and lighter flavor compounds which are not steam distillable, and hence, are not present in essential oil.

These traditional processes have a number of disadvantages. Most organic solvents are toxic, and government food regulations dictate that their residues must be reduced in the oleoresin to very small concentrations, generally in the range of 25–30 ppm or less. The distillation processes used to remove the solvents, or to recover essential oils, lowers the content of the very light volatiles which contribute to aroma and flavor. Of more importance is the growing consumer demand for food ingredients which are completely natural and free of contact with synthetic chemicals.

Apart from the separation of essential oil, the traditional extraction processes do not provide a method for selective fractionation of the oleoresin components. This fractionation must be carried out in additional processing steps involving further use of organic solvents or costly processes, such as for example, molecular distillation.

Extraction of spices with supercritical fluid carbon dioxide has been proposed as a means of eliminating the use of organic solvents and providing the prospect of simultaneous fractionation of the extract. Carbon dioxide is a natural biological product and an ingredient in many foods and beverages. However, conventionally, the supercritical process is capital intensive, operates in a discrete batch mode and, as practiced with known art, has not demonstrated cost competitiveness with solvent extraction.

SUMMARY OF THE INVENTION

The invention comprises a novel set of precise operating conditions and a plant configuration, which are shown to greatly improve the yields of spice extraction and purity of extract fractions using supercritical carbon dioxide fluid, as compared to prior art methods. The invention utilizes extraction temperatures in excess of those taught in the prior art; and therefore, the present method provides such unexpected results as a greater yield of oleoresin; higher average solvent loadings and consequent faster extraction; the concomitant extraction of aqueous material with the oleoresin; and the separation and withdrawal from the system of solid to semi-solid fixed oil fractions continuously without the development of blockages or other difficulties. Importantly, the invention allows for the optional one-, two-, or three-way fractionation of oleoresin components to obtain the full recovery of high quality essential oil containing steam volatile components in excess of 95 ml/100 gram; the flexibility to fractionate oleoresins into any combination of resins, triglycerides, essential oils and aqueous juices; and the flexibility to process a wide range of different spices into the highest quality extracts. The invention affords the capability to perform extraction in a true cascading mode, and hence, to allow a continuous extraction process with further improved carbon dioxide fluid average loadings with faster extractions and an improved economic performance.

Accordingly, the invention provides a process for extracting a spice to obtain oleoresin and fractionation products of the oleoresin. The process comprises grinding the spice to a fineness of about 30 mesh and extracting the ground spice with supercritical fluid carbon dioxide under a pressure of from about 400 bar to about 600 bar and at a temperature of from about 80° to about 120° C. At least one oleoresin fraction is precipitated from the loaded supercritical fluid under a pressure of from about 280 bar to about 380 bar and at a temperature of from about 80° C. to about 100° C. Additional oleoresin fractions may be obtained by next adjusting the pressure of the supercritical fluid to from about 100 bar to about 200 bar within the same temperature range of 80–100° C., and finally by reducing the pressure to from about 30 bar to about 50 bar and the temperature to from about 0° C. to about 30° C.

DETAILED DESCRIPTION OF THE INVENTION

Supercritical Fluid Extraction

Above a certain pressure (the critical pressure) and temperature (the critical temperature) a gas may be pressurized further without liquifying. This combination of pressure and temperature is known as the critical point, and above it the gas becomes a supercritical fluid. A gas in the supercritical fluid state exhibits the diffusivity of a gas but has the solvating power of a liquid. The supercritical fluid may be pressurized to achieve densities close to 1.0 kg/l, similar to many liquids. A further property of supercritical fluids is that for a given solute, solvating power is a complex function of fluid density. Consequently, supercritical fluids are often used to selectively extract or separate specific compounds from a mixture by varying fluid density through changes in pressure and temperature.

Carbon dioxide is the gas of choice for supercritical fluid extractions having food applications, since it has a manageable critical point (i.e., 73 bar and 31° C.), and it is relatively cheap, nontoxic, nonflammable and environmentally safe.

Figure 1:
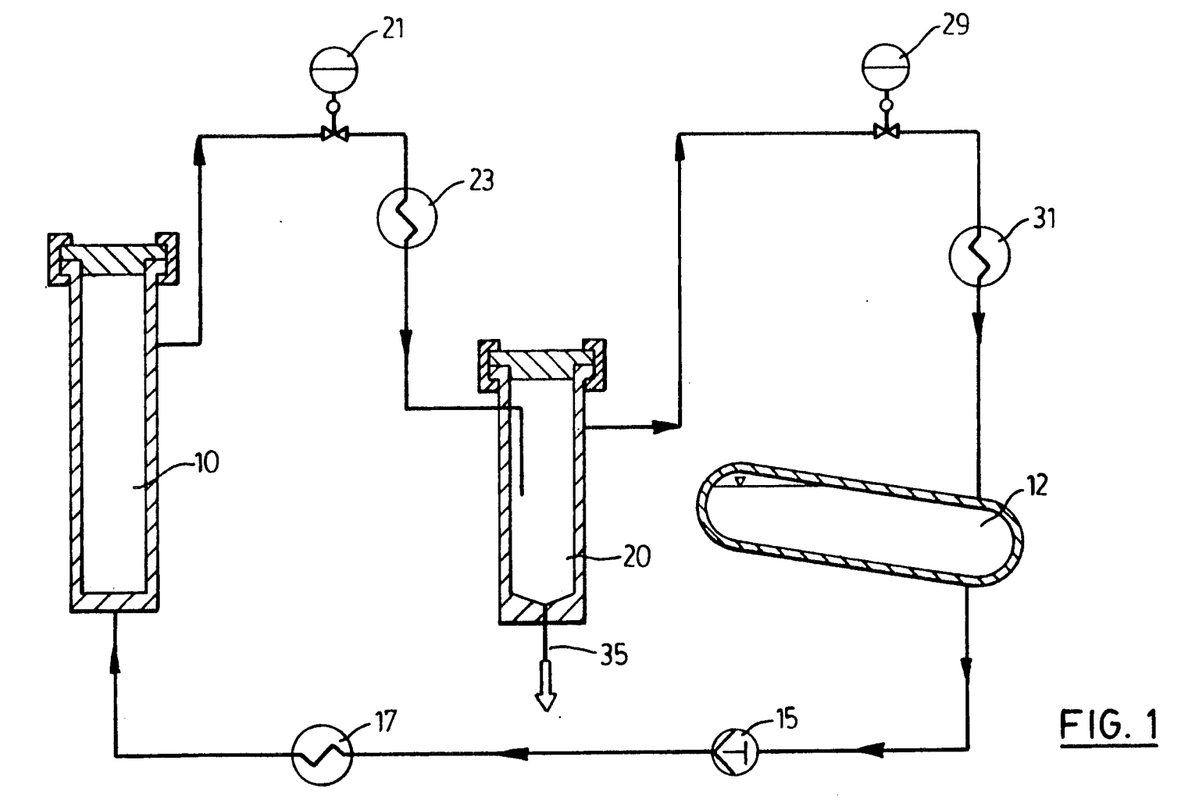
FIG. 1 is a schematic diagram of a system for batch extraction of spices using supercritical fluid carbon dioxide.

The principles of supercritical fluid extraction using carbon dioxide can be demonstrated by reference to FIG. 1. A high pressure extraction vessel 10 is charged with the material to be extracted and the vessel 0 is sealed. Carbon dioxide gas from a storage tank 12 is pumped by a pump 15 through a heat exchanger 17 and then into the extraction vessel 10. A pressure reducing valve 21 operates with the heat exchanger 17 to adjust the pressure and temperature of the supercritical fluid to that required for extraction. The supercritical fluid at the desired pressure and temperature flows through the vessel 10 to a separation vessel 20 by way of the valve 21 and a heat exchanger 23. A pressure reducing valve 29 and the heat exchanger 23 coact to adjust the pressure and temperature of the fluid (usually to produce a fluid of lower density) to that required in order to precipitate the extract of interest. The fluid exiting the vessel 20 returns to the tank 12 via the valve 29 and a heat exchanger 31. The process flow is thus circular with the supercritical fluid density being increased for extraction and decreased for precipitation. When the raw material is fully extracted the circulation of carbon dioxide is halted so that the extraction vessel 10 may be emptied and recharged. Extract is removed continuously from the separation vessel 20 via a valve controlled drainage line 35 if the extract is liquid, or it is removed manually through the opened top of the vessel 20 at the end of each cycle if it is very viscous or solid.

A number of operational inefficiencies can be noted from a consideration of this simplified representation illustrated in FIG. 1.

The process is batch-wise, and any extraction vessel 10 must proceed through the following cycle after the extraction of its contents is completed:

(a) depressurize the vessel (remove carbon dioxide fluid);
(b) open the vessel;
(c) remove the spent charge;
(d) recharge the vessel with fresh material;
(e) seal the vessel; and
(f) repressurize it with carbon dioxide to the operating pressure and temperature.

Even assuming the use of a pressure vessel 10 equipped with high pressure, quick opening closures allowing for the rapid and safe opening and closing of such vessels, and assuming the use of prefillable metal baskets to rapidly remove and replace raw material; the process of emptying and recharging an extraction vessel 10 is still unacceptably long for commercial purposes primarily due to the depressurization and repressurization steps required. For example, the adiabatic cooling effect of rapid depressurization can result in solidification of the carbon dioxide in the extraction vessel 10 which will greatly delay the changeover time. Depressurization must take place slowly enough to allow the transfer of heat from the ambient environment to meet the enthalpy needs of the expanding carbon dioxide gas exiting the vessel 10, and thus, prevent its solidification. For example, carbon dioxide supercritical fluid at 300 bar and 47° C. has an enthalpy of 585 kJ/kg, while in the gaseous state the enthalpy is 740 kJ/kg so that the heat input requirement is 155 kJ/kg of carbon dioxide. For rapid depressurization this heat must be put into the system. Such considerations are of critical importance in considering the efficient timing of pressure vessel turnover in multi-vessel cycling systems.

It should also be noted that the depressurization step will result in a loss of carbon dioxide, as it is vented to the atmosphere in each cycle. For example, an extraction vessel charged with ground spice typically accommodates one-half of its internal volume for the supercritical carbon dioxide fluid, and this would be lost during each vessel opening cycle, representing a significant annual cash cost. One recovery process proposed by Eggers and Sievers (Supercritical Fluid Science and Technology, ACS Symposium, 406:478 1989) involves three steps: the first being pressure equalization with a $CO_2$ working tank at about 60 bar, then further pressure reduction using a recovery compressor and subsequent recompression to the working tank and finally, at a residual pressure of 2 to 8 bar, release of carbon dioxide to the atmosphere.

It should be recognized that the time taken to fully extract the material in a vessel 10 with a given end product extract content and a given flow rate of supercritical carbon dioxide fluid is a function of the average amount of extract taken up by a unit weight of fluid during the extraction cycle. This loading factor varies throughout the extraction cycle, but its average reflects the efficiency of the extraction process. For example, an extraction vessel 10 of 500 litre fillable capacity might yield 15 kilograms of extract from a 150 kg charge of raw material having a density of 0.3 kg/l. If supercritical carbon dioxide fluid flowing through the vessel at 5000 kg/hr took 0.50 hours to remove the extract, then the average loading factor would be $15/(5000 \times 0.50)$ or 6 grams/kg $CO_2$. The higher the average loading factor, the shorter the extraction cycle and the more efficient the extraction process.

State of the Art

Stahl et al. (Dense Gases for Extraction and Refining, Springer-Verlag, Berlin, 1988) provide a comprehensive review of supercritical fluid applications in the extraction of spices.

Vitzthum et al. (U.S. Pat. No. 4,123,559) describe the extraction of pepper, cloves, vanilla and cinnamon with supercritical gases at pressures in the range of 280-400 bar and temperatures in the range of 50-80° C. The process proceeds in discrete batches, and the extraction conditions result in heterogenous mixtures of fixed oil components and essential oil. An optional second step is to re-extract the spice residue with supercritical carbon dioxide containing water.

Behr et al. (U.S. Pat. No. 4,490,398) also describe a two-step process with examples illustrating the process for extracting pepper, ginger, cloves, fennel and sage. In the first step of the Behr et al. process, the essential oil is removed from the spice with liquid carbon dioxide (that is, subcritical carbon dioxide, or carbon dioxide gas in the liquid state below the critical point of approximately 73 bar and 31° C.). Supercritical carbon dioxide is used in the second stage to remove the fixed oil components from the spice. However, the process is not effective in adequately separating the fixed and essential oil components. For example, fennel essential oil contained only 62% steam volatile material while the ginger fixed oil components were all recovered in the first fraction.

Stahl and Gerard (Parfuem. Kosmet, 64:237 1983) describe methods for improving the recovery of higher purity essential oils from, for example, anise, caraway, cloves and cinnamon. One procedure is to carry out a first spice extraction with supercritical carbon dioxide at a relatively low fluid density to recover essential oil. The spice residue is then re-extracted with supercritical carbon dioxide at a higher fluid density to recover fixed oil components. This process is called fractional extraction. As an example, anise was extracted with supercritical carbon dioxide at 90 bar and 40° C. to recover an essential oil containing 85% steam volatile components. Re-extraction of the anise residue at 300 bar and 40° C. gave a 10% yield of fatty oil. Fractional extraction as taught by Stahl and Gerard, as well as by Vitzhum et al. (ibid), and Behr et al. (ibid), suffers from the inherent inefficiency resulting from the need to extract the spice twice. As an alternative, Stahl and Gerard describe a process of fractional separation in which both classes of substance are extracted together by using a higher density fluid. The fluid then passes to one or more separating vessels where the fluid density is lowered in stages to recover first the fixed oils and then the essential oil. As examples, anise, caraway, cloves and cinnamon were extracted with carbon dioxide at pressures between 90 and 300 bar and at temperatures of 0 to 40° C. The fluid density was then lowered in 2 or 3 stages under conditions 75-90 bar and 40-45° C., 30-80 bar and 0-55° C., and 30 bar and 020 C. respectively. The stage 3 recoveries contained over 80% steam volatile essential oil. However, fixed oil separations were poorly effected and still contained relatively large amounts of essential oil. Under these conditions of extraction, the total yields of fixed oil, and hence total oleoresin yield, were one-half to one-third of those achieved using solvent extraction. In summary, the principle of fractional separation overcomes the inefficiency of two-stage extraction, but as taught by Stahl and Gerard, results in uneconomic yields of oleoresin and poor fractionation of the fixed oil components.

The principle of fractional separation (as compared to fractional extraction) gives rise to the concept of using two or more separators in series to approximate semi- or quasi-continuous extraction.

Stahl et al. (ibid, 1988) describe the use of several extractors in series which are operated in a countercurrent extraction, quasi-continuous process. As an example, four extractors may be operated on the following cycle: 1. the first vessel being exhaustively extracted is withdrawn from the cycle by valve operation; 2. its pressure is released; 3. it is refilled with raw material and reintroduced into the line so that it is traversed by the dense gas as the last vessel of the series. This process is called cascading extraction, and it has the advantage that the average loading rate might be increased, because the carbon dioxide fluid carrying low quantities of oleoresin from partially extracted vessels can dissolve more oleoresin from the new vessel introduced in step 3, thus effectively increasing the average loading rate of the carbon dioxide fluid, and hence, the oleoresin extraction rate per hour. However, the process as described by Stahl et al. does not allow for the recovery of carbon dioxide during depressurization, does not address the problem of adiabatic cooling, and does not teach a process which synchronises vessel changeover into the continuous batch cycle.

It is known to those skilled in the art that both higher rates of extraction and higher yields of oleoresins generally result from the use of supercritical gases at higher fluid densities. Higher fluid densities are obtained by increasing the fluid pressure or decreasing the fluid temperature or both. However, an upper constraint on fluid pressures exists which is related to the capital costs of vessel fabrication.

Increasing the temperature has a positive effect on the extraction rate and yield by acting directly to lower the viscosity of the heavier oleoresin components. The interaction of the effects of lower temperature to increase fluid density and higher temperature to reduce oleoresin viscosity can lead to complex temperature relationships in relation to extraction rate and yield. According to existing art teachings, the range of useful extraction temperatures is bounded by the extraction rate and yield on the lower side and by the sensitivity of the volatile components of the extract on the higher side. This accepted teaching results in the typical supercritical fluid extraction temperature operating range of 40-80° C. for spice extraction. For example, Vitzthum et al. (ibid) teach an upper temperature operating range of 80° C. for the supercritical carbon dioxide extraction of spice.

It is also understood by those skilled in the art that spice extractions giving increased oleoresin yields containing heavier and more complex components result in further difficulties in fractionating the essential oil and fixed oil components. Stahl et al. (ibid 1988 p. 149) states: "The extraction of pure spice oils and aroma components with dense carbon dioxide requires optimised solvent selectivity because most starting materials containing essential oils have also lipophilic constituents of low volatility, such as fatty oils, waxes, resins and coloring matter. This is not discussed in many examples of use. The extractions are often carried out under drastic conditions, e.g. at pressures of 250-300 bar and temperatures of 40-60°C....."

An example of the application of known art in the extraction of spices using supercritical carbon dioxide fluid is given by Novak and Robey (Supercritical Fluid Science and Technology, ACS Symposium Series, 406:511 1989). These authors discuss a preliminary design for a multiproduct spice extraction plant based on two extractors designed to operate under extraction conditions of 60 to 300 bar and 20 to 80° C. Separation conditions proposed were 45 to 150 bar and 15 to 40° C. Oleoresin average yields (% by weight of 10% moisture raw material) and average loading factors (grams oleoresin/kilogram of carbon dioxide) estimated from the data for their process for some selected spices are:

| Raw Material | Yield | Average Loading Factor |
| --- | --- | --- |
| Black Pepper | 9.9 | 1.8 |
| Nutmeg | 35.6 | 6.2 |
| Ginger | 4.5 | 0.9 |
| Cassia | 2.3 | 0.7 |
| Caraway | 19.8 | 5.3 |
| Thyme | 2.1 | 0.3 |

Yields from the resinous spices such as thyme, ginger, cassia and black pepper are low in comparison with solvent technology, and the average loading factors are indicative of long inefficient extraction times. Both parameters lead to an uneconomic process.

Lenhard et al. (Second International Symposium On Separation Science and Technology, Canadian Chem. Eng. Soc. Conf., Hamilton, Ontario, 1989) discussing process optimization procedures, provide an example of the supercritical fluid carbon dioxide fractional extraction of black pepper using extraction conditions of 200 bar and 46° C. Fractionation conditions were 80 bar and 40° C. for the first separation vessel and 60 bar and 28° C. for the second separation vessel. Total yield was 12.0%, but the average loading rate was only 2 grams of oleoresin/kilogram of carbon dioxide fluid, similar to the example of Novak and Robey. Separation conditions were not optimal as evidenced by the relatively low yield of essential oil (1.7%) collected in the second separation vessel.

Clearly there is need for an improved supercritical fluid extraction process for spice having both improved oleoresin extraction rates and yields which is cost competitive with other technologies, and provides flexible and satisfactory fractionation of fixed oil components and essential oils.

Figure 2A:
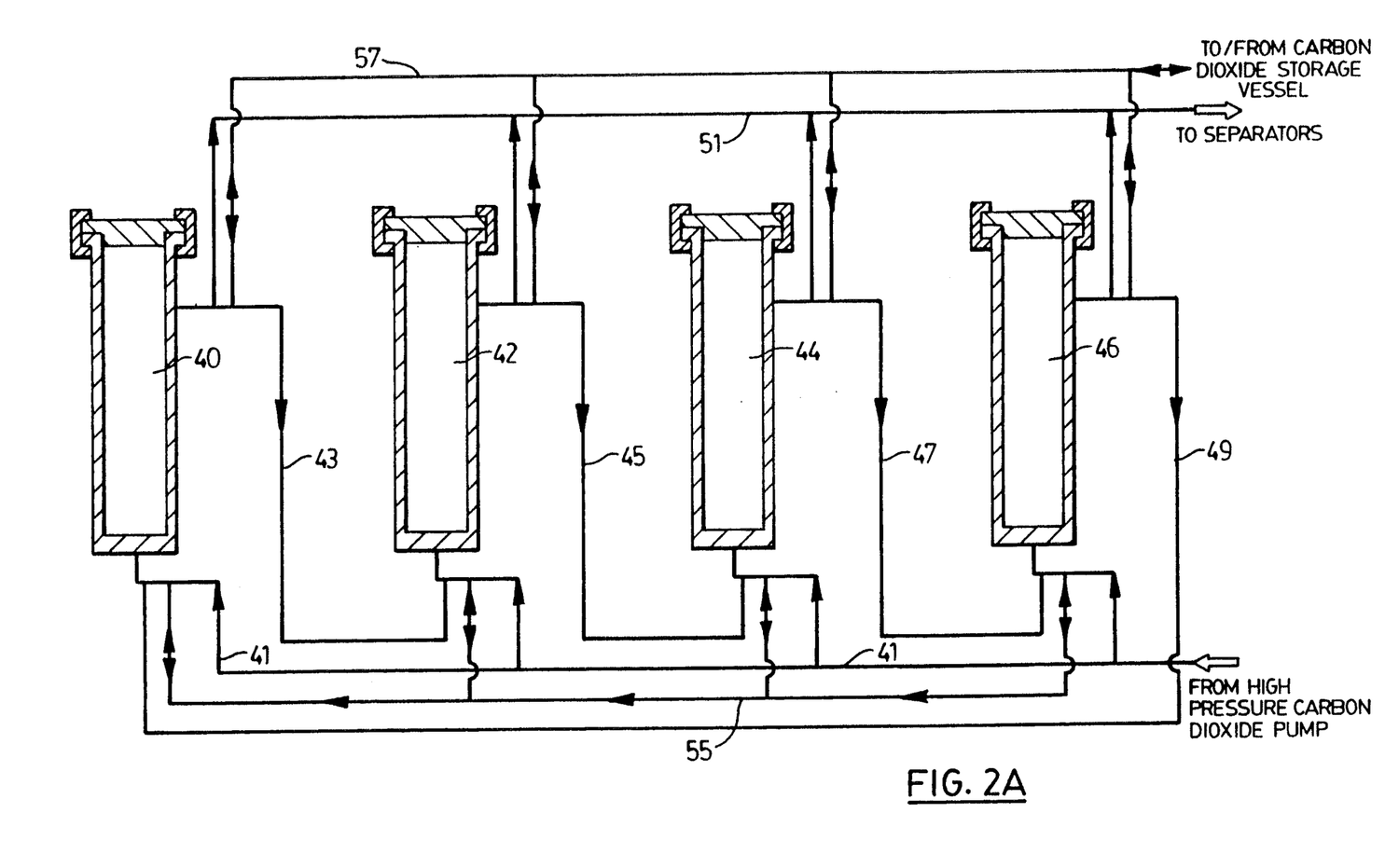
FIGS. 2A and 2B are schematic diagrams of a continuous system for extracting and fractionating spices in accordance with the process of the invention.
Figure 2B:
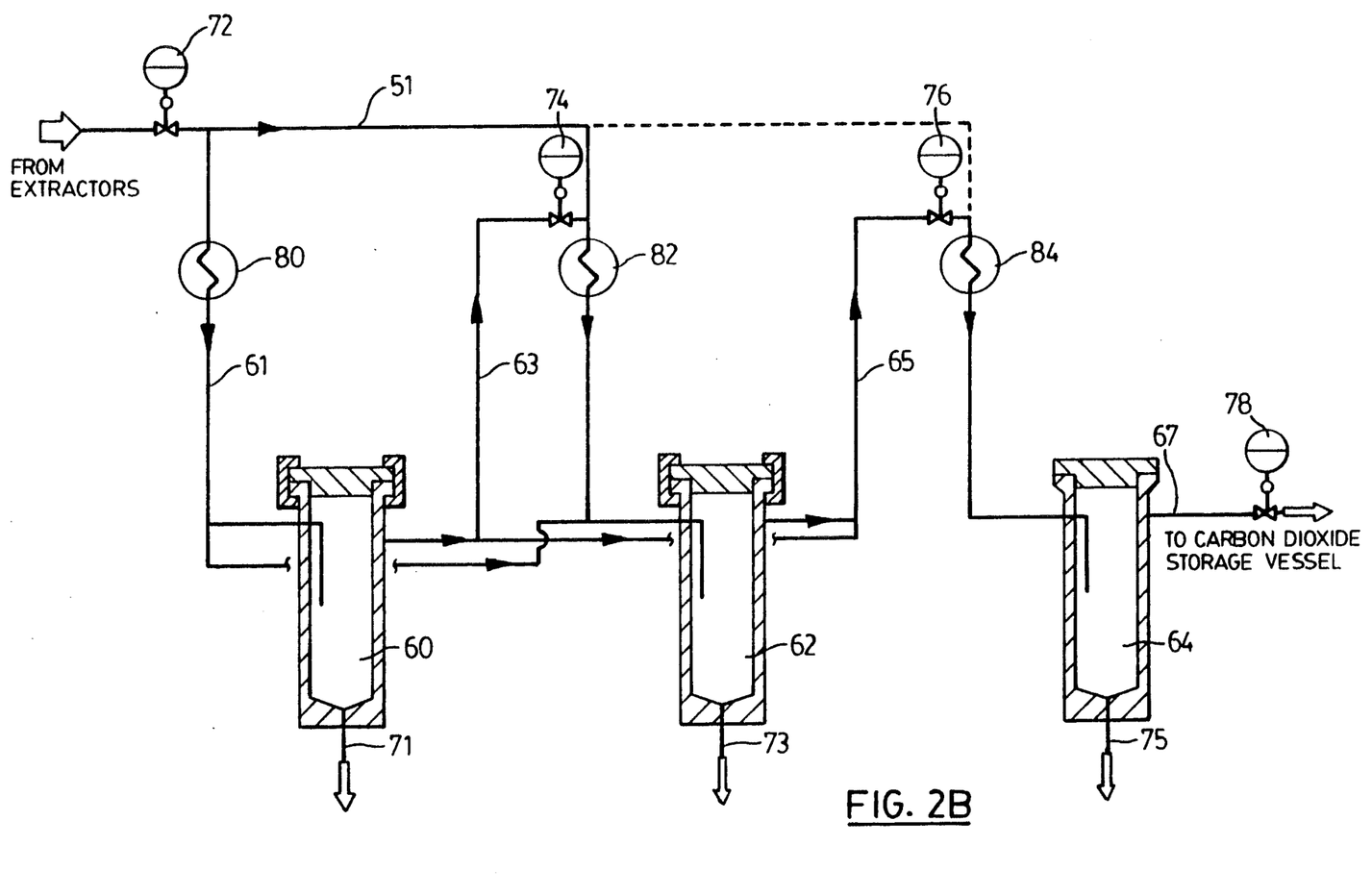

Referring to FIGS. 2A and 2B, the preferred embodiment of the invention employs an extraction apparatus having four pressure extraction vessels 40, 42, 44 and 46 connected in series. Each vessel 40, 42, 44 and 46 is provided with a charge of ground spice raw material. At start-up of the extraction cycle, the four vessels 40, 42, 44 and 46 are pressurized with carbon dioxide gas and supercritical fluid carbon dioxide at the desired pressure and temperature is then introduced into the first vessel 40 through the line 41. For simplicity, the valves in the various lines of the extraction apparatus have not been included in FIG. 2A. The supercritical fluid flows through the vessel 40, out the line 43 and into the vessel 42. The flow through the vessel 42 passes from it and through the line 51 which leads to the separation vessels 60, 62 and 64 shown in FIG. 2B.

The length of time for an optimal extraction of a spice depends on the loading factor under the extraction conditions and the expected yield of extract. Given the flow rate of supercritical fluid, the extraction cycle time for each spice can be calculated.

When half of the initial extraction cycle is completed in respect of the materials in the vessels 40 and 42, the vessel 44 is brought into the cycle by directing the flow of supercritical fluid exiting the vessel 42 through the line 45 and into the vessel 44. The flow of supercritical fluid carbon dioxide into the first vessel 40 is stopped and the inflow through the line 41 proceeds directly into the vessel 42. The outflow of supercritical fluid from the vessel 44 proceeds through the line 51 to the separators 60, 62 and 64.

Pressure is then equalized between the vessels 40 and 46 via the pressure equalization line 55. With the equalization line 55 closed, the pressure in the vessel 40 is then equalized with the carbon dioxide storage tank (not shown) via the line 57. With the vessel 40 being isolated from the system, the residual pressure in the vessel 40 is then released to the atmosphere. At this time, the fourth vessel 46 is pressurized up to operating pressure via the line 41.

The extracted raw material is removed from the depressurized vessel 40 and replaced with a fresh charge of ground spice. The recharged vessel 40 is closed and pressurized with carbon dioxide gas via the line 57.

At the end of the full extraction cycle for the material in the second vessel 42, the supercritical fluid flowing from the vessel 44 is directed through the line 47 and into the fourth vessel 46. The outflow from the vessel 46 proceeds through the line 51 to the separators 60, 62 and 64. The inflow of supercritical fluid through line 41 now enters directly into the vessel 44 effecting the removal of the vessel 42 from the extraction cycle. As described in relation to the vessels 40 and 46, the pressure in vessel 42 is first equalized with the vessel 40, is then equalized with the carbon dioxide storage tank, and finally, is released to atmosphere. The vessel 42 is then depressurized and recharged and reentered into the system (as described for the vessel 46) when the extraction cycle is completed in respect of the vessel 44.

Thus, the cascading operation of the extraction apparatus affords a means for conducting a continuous spice extraction process under conditions providing an optimal yield of extract for fractionation. In accordance with the invention, the extraction conditions comprise grinding the spice to a fineness where at least 75 weight % of the material passes through a 30 mesh screen. Preferably, the grinding is carried out at a temperature no higher than −20° C. Grinding the spice under liquid nitrogen has been found to provide satisfactory results.

The extraction of the ground spice with supercritical fluid carbon dioxide is carried out at pressures of from about 400 bar to about 600 bar and at temperatures of from about 80° C. to about 120° C. The preferred operating conditions for extraction of ground spice are a supercritical fluid pressure of from about 450 bar to about 550 bar and a temperature of about 90° C. to about 100° C.

The process of the invention comprises a fractionation of the extract which yields superior results in the separation of fixed oil components and essential oils when compared with the prior art. FIG. 2B shows a preferred configuration of a fractionation apparatus for carrying out the process of the invention. As with FIG. 2A, not all line valves are shown in FIG. 2B for simplicity.

Referring to FIG. 2B, supercritical carbon dioxide fluid exiting the extraction system is passed sequentially through a series of three separation vessels 60, 62 and 64 which have been engineered to operate at pressures of typically up to 350 bar, 250 bar and 100 bar respectively and at temperature ranges typically of 30–120° C., 30–120° C. and 0–50° C. respectively. The separators 60, 62 and 64 operate to precipitate the oleoresin extracts in three fractions through the operation of the main pressure reducing station 72 in the line 51, which controls the pressure in the extraction system and at the same time through the line valve 72 controls the flow of extract loaded carbon dioxide to the separators 60, 62 and 64. The pressure reducing stations 74, 76 and 78 downstream of each separator 60, 62 and 64 and heat exchangers 80, 82 and 84 upstream of each separator 60, 62 and 64 operate to control the conditions in each separator vessel. To obtain three fractions of the extract, the loaded supercritical fluid carbon dioxide flows through the pressure reducing station 72 in the line 51, through the heat exchanger 80 in the line 61 and into the separator 60. The pressure and temperature of the supercritical fluid in the separator vessel 60 are maintained in the ranges of from about 280 bar to about 380 bar and from about 80° C. to about 100° C. It has been found that the more preferred conditions for fractionation in the separator 60 are a pressure of from about 300 bar to about 350 bar and a temperature of from about 80° C. to about 90° C. These pressure and temperature conditions are maintained through the operation of the pressure stations 74 and the heat exchanger 80.

The oleoresin fraction which precipitates out of the supercritical fluid in the separator 60 is removed from it through the drain line 71. This first oleoresin fraction is normally a solid or very thick resin at room temperature and atmospheric pressure, and removal of the fraction from the vessel 60 may proceed continuously through the drain line 71 if the rate of precipitation allows.

The flow of supercritical fluid, according to this embodiment of the invention, proceeds from the separator 0 through the line 63, the pressure-reducing station 74 and the heat exchanger 82 into the second separator vessel 62. The temperature of the fluid is adjusted in the heat exchanger 82, and the pressure of the fluid in the separator 62 is adjusted by the downstream pressure-reducing station 76. Fractionation conditions in the separator 62 are a pressure in the range of from about 100 bar to about 200 bar and a temperature in the range of from about 80° C. to about 100° C. The more preferred conditions for the fractionation in the separator 62 are a pressure in the range of from about 115 bar to about 180 bar and a temperature range of from about 80° C. to about 90° C.

The second oleoresin fraction is removed from the separator 62 via the drain line 73, and again, collection of the fraction may proceed continuously if the precipitation rate so allows. The second fraction is a material being lighter than the first fraction, and is usually a resin or oil.

The third oleoresin fraction is recovered in the third separator 64 which receives the flow of fluid from the separator 6 via the line 65 and the heat exchanger 84. The pressure in the separator 64 is regulated by the pressure station 78 in the line 67 downstream of the separator 64. The fluid carbon dioxide in the separator 64 is not supercritical. The pressure of the carbon dioxide fluid in the separator 64 is in the range of about 30 bar to about 50 bar, and the temperature is in the range of about 0° C. to about 30° C. Preferred ranges are a pressure of from about 30 bar to about 35 bar and a temperature of from about 5° C. to about 20° C. Essentially barren carbon dioxide exiting the separator 64 through line 67 is returned to the carbon dioxide storage vessel.

The third oleoresin fraction comprises essential oil and is removed from the separator 64 via the drain line 75, preferably in a continuous flow if the precipitation rate allows. The natural aqueous juices of the spice may also be recovered from the separator 64 concurrently with the recovery of essential oil, and these two components, which usually form at least a partial emulsion, may be separated by centrifuging.

The skilled person will appreciate that the fractionation system shown in FIG. 2B may be operated to by-pass the first separator 60 or the second separator 62 or both. Also, a two step fractionation can be carried out between the separators 60 and 62. Other variations may be useful for special situations.

An important aspect of the process of the invention is the use of a higher extraction temperature range than is taught in the prior art which provides the unexpected consequence that spice oleoresin yields and extraction rates (as measured by average loading factors) are greatly increased despite the fact that the supercritical carbon dioxide fluid extraction densities are lower than those taught to be optimal in prior art. For example, the density of supercritical carbon dioxide fluid under conditions of 350 bar and 40° C., as typically specified in the prior art, is 0.91 kg/litre; while under conditions of 500 bar and 95° C. in accordance with the present invention, the fluid density is 0.84 kg/litre. Despite the decrease in density, it is found that oleoresin yields are increased typically on the order of 1.3 times and the average loading factors are increased typically on the order of 2.0 times. A further unexpected consequence of the extraction conditions according to the invention is that spice aqueous juices are co-extracted along with the oleoresin, thus providing a valuable by-product. Yet a further unexpected consequence of the process extraction conditions is the partial bacterial and fungal sterilization of both the oleoresin extracts and the extracted spice residue, the latter being a useful food-grade product.

From an operations viewpoint, a surprising advantage of the process extraction conditions of the invention is that the heat content of the supercritical carbon dioxide extraction fluid is sufficient to meet the change in enthalpy resulting from adiabatic cooling on depressurization of the supercritical fluid, thus permitting the operation of a cascading extraction system without delays in vessel changeover or the need to inject heat into the system. For example, the enthalpy of supercritical carbon dioxide fluid at 500 bar and 97° C. is 670 kJ/kg. To bring the enthalpy of this fluid to that of gaseous carbon dioxide (740 kJ/kg), an increase of only 70 kJ/kg is required, which is less than one-half of the requirement estimated for prior art processes. Furthermore, however, assuming that the ground spice raw material has a specific heat no greater than that of wood (1.88 kJ/kg° C.), and that the desired end temperature is 17° C., the amount of heat that could be withdrawn from one kilogram of the raw material is $1.88 \times (97 - 17) = 150$ kJ. This amount of heat is double that required to cover the change in enthalpy without taking account of the heat that is also available from the steel vessel and basket. Thus, depressurization can proceed without delay and without the need for injection of heat, so that vessel changeover can take place within the time framework of a continuous cascading batch extraction cycle. An additional feature of the extraction process of the present invention is that carbon dioxide recovery during depressurization of the extraction vessel takes place first by way of pressure equalization with the freshly charged vessel to next come on line, thus allowing the maximum conservation of heat within the system.

The practical upper limit for the extraction process is 120° C., since at this temperature the oleoresins begin to develop a burned aroma and flavor. Likewise, the upper limit for the extraction pressure according to the invention is 600 bar, as degradation and extraction of spice structural material begins to take place at higher pressures under the specified temperature conditions.

The fractionation process of the invention requires that for the supercritical fluid, the temperature be kept between 80° C. and 100° C. An unexpected consequence of this separation temperature range is that viscous semisolid resins, such as those, for example, from black pepper, cinnamon and ginger, are sufficiently fluid to allow easy withdrawal from the separators, enabling continuous separation. A further unexpected result of the separation process is that the precipitation of water does not take place during the fractionation under supercritical fluid conditions, but is delayed until the last separator where it can be collected along with the essential oil and easily separated by centrifuging.

The invention provides a continuous three-way fractionation of extracted oleoresin into two fixed oil fractions and one essential oil plus water fraction under the specified separation pressure and temperature parameters for the three separation vessels. An advantageous result of the fractionation conditions of the invention is that a precise split between essential oil and fixed oil components is effected with the essential oil fraction containing typically 95 ml of steam volatile oil per 100 grams and in the fixed oil fractions less than 5 ml of steam volatile oil per 100 grams. This degree of fractionation is maintained across a range of different raw material spices by providing that the pressure in the second separator is selected at the lower end of the specified range for raw materials with a high fixed oil:essential oil ratio and selected at the higher end of the specified range for raw materials with a low fixed oil:essential oil ratio. For example, a preferred second fractionation pressure for rosemary (fixed oil:essential oil =3.5) would be 115 bar and a preferred second fractionation pressure for cloves (fixed oil:essential oil =0.3) would be 180 bar. A further consequence of the separation conditions of the process is that fractionation between resins and triglycerides is effected, thus providing a useful process to remove triglycerides from resin and essential oil flavor components. It will be apparent to those skilled in the art that the three-way fractionation process offers complete flexibility for the recovery of one-, two- or three-way oleoresin splits as well as for flexibility in the combination of fractions.

EXAMPLES

Methods

Samples of whole dried spices were purchased from commercial spice trade channels in 25 to 100 kg quantities. Prior to extraction, the spices were passed once through a hammer mill (Fitzmill model D-6) with a #0030 screen. Some spices such as whole nutmeg and vanilla beans required a pre-breaking on a coarser screen. Liquid nitrogen was injected into the grinding chamber during grinding at a rate sufficient to maintain the temperature of the emerging ground spice at less than $-20°$ C.

Approximately 1.5 kg samples of each ground spice were extracted in a pilot supercritical apparatus manufactured by Udhe GMBH, and modified by the addition of one extra vessel. The apparatus comprised four vessels of 4 litres capacity each which could be configured as one extractor and three separators or two extractors and two separators. Samples of each spice were extracted at 300 to 350 bar and 40 to 80° C., and also, at 500 bar and 95 to 105° C. Extractions were carried out in batch mode (one vessel extracted to completion at a time) and in cascade mode (countercurrent extraction of two vessels in series at one time with alternating vessel changeover). In the batch mode, one-, two- and three-way fractionations were carried out using the one extractor/three separator configuration of the apparatus. In the cascade mode, one- and two-way fractionations were carried out using the two extractor/two separator configuration. Fractionation conditions were kept in the range of 300 to 350 bar and 80 to 90° C. (first or second separator), 115 to 180 bar and 80 to 90° C. (first or second separator) and 30 to 35 bar and 5 to 20° C. (third separator). Extract fractions were recovered through valve controlled drain lines at the bases of the separator vessels. The carbon dioxide flow rate was maintained close to 45 kg/hr., and the total carbon dioxide flow was recorded.

Sieve analyses were carried out on samples of all spices after grinding. Ground raw materials and extracted residues were sampled and measured for total ether extract (AOCS Official Method Bc 3-49), essential oil (ASTA Official Method 5.0) and moisture (AOCS Official Method F 1a-44). Yields of all fractions were determined gravimetrically and mass balances were completed. Essential oil contents of 111 fractions were determined and essential oil mass balances were completed.

Loading factors were measured by three methods. Average loadings were determined by dividing total oleoresin yield (gm) by total carbon dioxide flow (kg) at the end of each extraction run. In the case of high yielding spices (20%+) real time loadings were determined by plotting the incremental gravimetric yield for all fractions against the incremental carbon dioxide flow at regular periods during the extraction run. For a precise real time loading estimation, supercritical fluid flowing from the extractor system was sampled through a fine metering valve into a glass tube with a side-arm for solvent escape. Solvent exiting the side-arm was passed by way of a fine tube to a wet meter. The amount of extract was determined by the weight gain of the glass tube and the amount of solvent directly measured on the wet meter, thus allowing computation of the loading of the extract in the carbon dioxide (after adjusting for water content) as at that point in the extraction cycle and under those particular pressure and temperature conditions.

Samples of fractions from all spices were submitted to international flavor and food ingredients companies for organoleptic and other quality evaluations.

Grinding

Sieve analyses showed that all ground spices tested conformed to 75% of particles passing 30 mesh. Typical analyses were 75-90% passing 30 mesh, 65-85% passing 40 mesh and 50-80% passing 60 mesh. Both oleoresin yields and average loadings decreased when 50% or more of a ground spice did not pass 30 mesh.

Yields

Total oleoresin yields are given in Table I for extraction under conditions typical of prior art processes and for conditions typical of those disclosed by the present invention. Yields obtained according to prior art processes are not significantly different for those presented by Novak and Robey (ibid, 1989) for comparable spices which had been derived from proprietary experimental data.

Table I clearly demonstrates the improvement in total oleoresin yield resulting from extraction under conditions of the present invention. For those spices where direct comparison is possible, an average increase of 34% is achieved by the process of the invention. This increased yield results directly in a 25% decrease in the raw material cost component of the oleoresin extract.

It will be known t those skilled in the art that attempts to increase yields above those given in Table I by the simple expedient of extending the extraction period will result in a decrease in the average loadings. As discussed below, the present process provides a distinct advantage over prior processes in this regard.

Mass balances confirm a greater than 97% recovery of the extracted oleoresins and extracted essential oils and a greater than 97% extraction and recovery of the essential oils.

TABLE I

Comparative Oleoresin Yields (Water-free)

| Spice | bar/°C. | Yield (%) | bar/°C. | Yield (%) |
|---|---|---|---|---|
| Allspice | 330/40 | 7.5 | 500/95 | 8.7 |
| Basil Leaf | 350/40 | 1.7 | 500/100 | 2.7 |
| Capsicum | 330/40 | 8.8 | 500/95 | 12.5 |
| Cardamom | 350/40 | 3.3 | 500/95 | 5.7 |
| Cassia | 350/40 | 2.6 | 500/100 | 4.9 |
| Celery | 340/65 | 17.8 | 500/90 | 22.5 |
| Cloves | 330/40 | 17.0 | 500/90 | 21.4 |
| Coriander | 350/40 | 19.0 | 500/90 | 20.1 |
| Cumin | 355/45 | 23.0 | 500/90 | 22.5 |
| Dill | 350/40 | 11.0 | 500/90 | 13.1 |
| Ginger | 340/80 | 4.1 | 500/100 | 6.5 |
| Nutmeg | 330/40 | 28.4 | 500/90 | 43.0 |
| Oregano | 300/40 | 3.8 | 500/100 | 5.5 |
| Paprika | 350/50 | 6.0 | 500/95 | 7.4 |
| Parsley Leaf | 350/50 | .5 | 500/100 | 3.3 |
| Pepper, Black | 340/65 | 11.0 | 500/100 | 13.0 |
| Rosemary | 300/40 | 3.4 | 500/105 | 6.8 |
| Sage | 350/55 | 2.7 | 500/100 | 7.2 |
| Thyme | 350/40 | 1.0 | 500/100 | 3.1 |
| Turmeric | 350/40 | 4.3 | 500/95 | 5.6 |
| Vanilla | 350/50 | 7.4 | 500/95 | 12.5 |
| Average | | 8.8 | | 11.8 |

Loadings

Table II presents average loading data under the conditions of prior art (350 bar/40° C.) as compared with the present invention (500 bar/95° C.). The average loading data for the present invention are given for both batch and cascade modes of extraction.

Table II clearly demonstrates the effectiveness of extraction under the revealed pressure and temperature conditions of the invention which result in an average two-fold increase in average loading factors. Additionally, a further two-fold increase results from the application of extraction in the cascading mode giving a four-fold total increase in average loading factors as compared to the example representative of the prior art. Extraction according to the present process proceeds in one-quarter of the time required for the prior art process. The extraction data for spices processed according to the invention are unique in the art of supercritical extraction of spices. They result directly in total operating costs (fixed and variable excluding raw material) of 25% of those costs typical of prior art processes for the extraction of spice oleoresins using supercritical fluid carbon dioxide.

TABLE II

Comparative Loadings (gm water-free oleoresin/kg carbon dioxide)

| Spice | 350 bar/40° C. | 500 bar/95° C. Batch | 500 bar/95° C. Cascade |
|---|---|---|---|
| Allspice | 6.3 | 7.3 | 15.0 |
| Basil Leaf | .4 | .7 | 1.7 |
| Capsicum | 2.5 | 5.0 | 10.0 |
| Cardamom | .9 | 4.5 | 9.2 |
| Cassia | .6 | 2.0 | 4.0 |
| Celery | 6.3 | 9.5 | 19.2 |
| Cloves | 6.2 | 17.9 | NA |
| Coriander | 5.9 | 8.0 | 16.8 |
| Cumin | 3.0 | 9.3 | 19.5 |
| Ginger | 1.7 | 2.7 | 5.4 |
| Nutmeg | 7.6 | 17.7 | 38.0 |
| Oregano | 1.3 | 5.0 | 9.5 |
| Paprika | 1.7 | 2.3 | 4.7 |
| Parsley Leaf | .1 | .8 | NA |
| Pepper, Black | 3.9 | 5.3 | 10.5 |
| Pepper, White | 3.5 | 5.0 | 10.0 |
| Rosemary | 1.0 | 2.1 | 5.0 |
| Sage | .4 | 2.5 | 5.2 |
| Thyme | .3 | 2.7 | 4.7 |
| Turmeric | 1.8 | 2.8 | 6.0 |
| Vanilla | 3.2 | 6.5 | 13.5 |
| Average | 2.8 | 5.8 | 11.0 |

Figure 3:
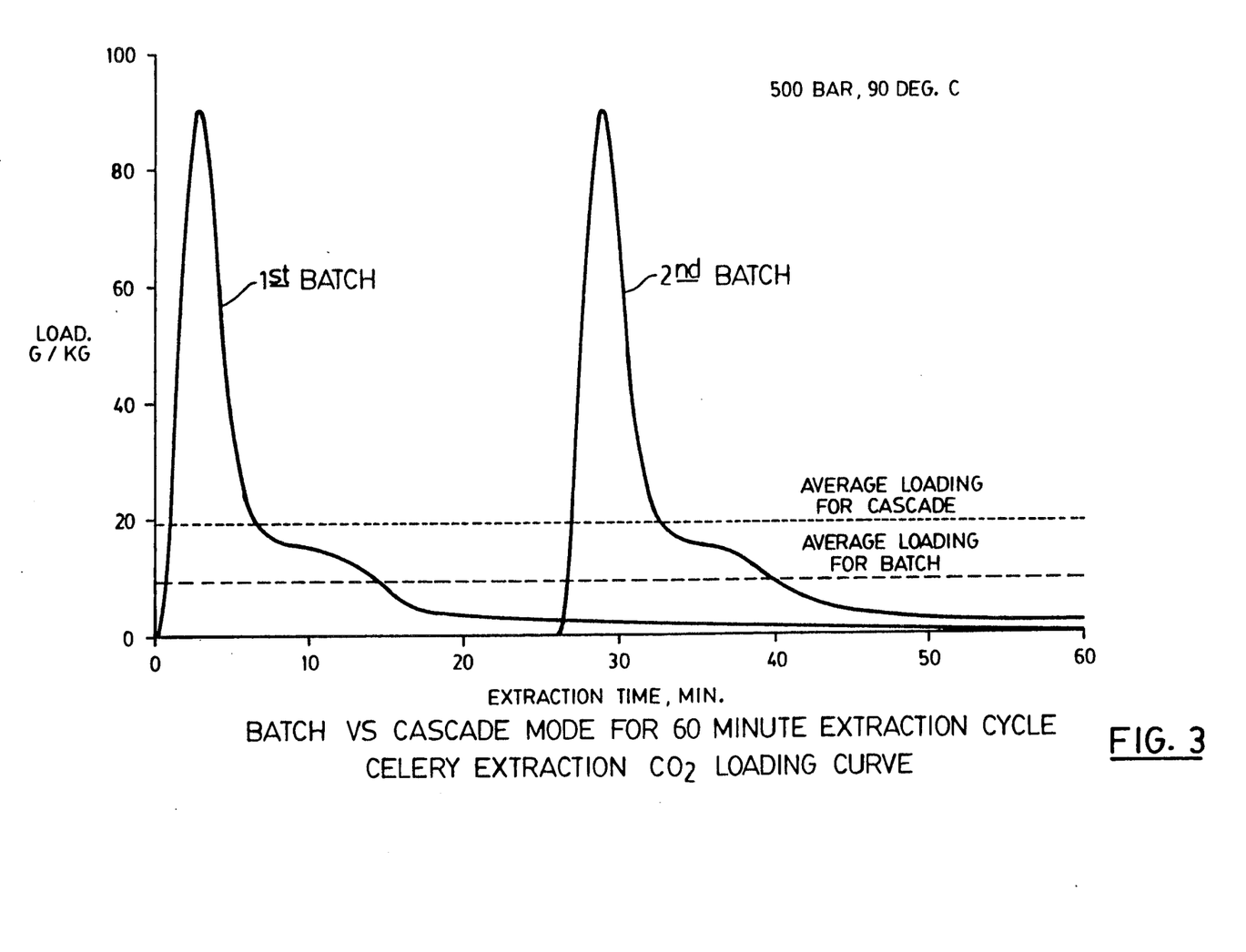
FIG. 3 is a graph showing the extraction loading curve for celery under process conditions according to the invention.

Cascading (A) FIG. 3 shows a typical loading curve (here using celery as an example) during the 60 min. extraction cycle for a batch extraction. It can be seen that some 90% of the oleoresin is extracted in the first half of the extraction cycle. Loadings rise rapidly to near 90 gm/kg and then fall away as the more soluble oleoresin components are depleted. In this example, the average loading for the full batch extraction period is 9.5 gm/kg. FIG. 3 also shows the increased efficiency resulting from changing to a cascade mode in which a freshly charged extraction vessel is brought on-line in series at about the halfway point of the extraction cycle for the first batch. The average loading is then increased to 19.2 gm/kg.

(B) The cascading process as described above can only continue as long as a freshly charged vessel can be prepared (i.e., carry out the cycle: depressurize, open, empty, fill, close, repressurize) to come on line every one-half extraction cycle. As discussed, the ability to recycle an extraction vessel in a timely fashion depends on the ability to meet the thermodynamic requirements of the system. Extracted dill seed was depressurized to atmosphere from extraction conditions of 500 bar and 97° C. and the temperature measured. Rapid depressurization resulted in a minimum temperature of between 20° C. and 25° C. Slower expansion gave a temperature of 40° C. to 45° C. It is apparent that the disclosed extraction pressure and temperature conditions are effective in providing sufficient heat in the supercritical carbon dioxide fluid to more than meet the enthalpy requirements on depressurization. Cascading extraction can thus proceed within the one-half extraction cycle time availability to achieve a process allowing continuous flow of oleoresin to the separators.

Fractionation rates of flow of oleoresin to the separators, and the co-extraction of water, all lead to a special requirement for fractionation conditions that will provide clean essential oils and clean fixed oil components. As reviewed earlier and acknowledged by Stahl et al (ibid, 1988), this aspect of supercritical fluid extraction of spices is poorly accomplished by prior art processes. The high pressure/high temperature fractionation process of the present invention provides effective fractionation of the total extract into high purity components as the following typical data show.

| (A) Three-way Fractionation | | | | |
|---|---|---|---|---|
| Spice | Pressure/Temp. bar/°C. | Yield (wt. %) | Essential Oil (ml/100 gm) | Product |
| Pepper | 300/90 | 3.3 | <1 | Black resin |
| (Black) | 165/90 | 6.1 | <5 | Piperine (>60%) |
|  | 33/15 | 3.5 | 101 | Essential oil |
|  | " | 5.5 | — | Aqueous extract |
| Dill Seed | 300/85 | 2.5 | <1 | Dark-green resin |
|  | 165/80 | 6.7 | <5 | Vegetable oil |
|  | 34/13 | 3.8 | 96 | Essential oil |
|  | " | 5.4 | — | Aqueous extract |
| Cinnamon | 320/90 | .5 | <1 | Light-green pwdr. |
| (Chinese) | 170/90 | 2.0 | <5 | Soft brown resin |
|  | 33/13 | 1.5 | 95 | Essential oil |
|  | " | 4.2 | — | Aqueous extract |
| Cinnamon | 320/90 | .4 | <1 | Light-green pwdr. |
| (Korintji) | 180/85 | 1.4 | <5 | Soft brown resin |
|  | 32/15 | 3.1 | 95 | Essential oil |
|  | " | 3.6 | — | Aqueous extract |
| Ginger | 310/90 | .6 | <1 | Light-ginger res. |
| (Chinese) | 135/85 | 4.0 | <5 | Dark-ginger res. |
|  | 34/12 | 1.9 | 95 | Essential oil |
|  | " | 5.6 | — | Aqueous extract |
| Celery Seed | 300/85 | 2.5 | <1 | Dark-green resin |
| (Indian) | 170/80 | 18.0 | <5 | Vegetable oil |
|  | 30/14 | 2.0 | 104 | Essential oil |
|  | " | 5.0 | — | Aqueous extract |
| Rosemary | 320/90 | 1.2 | <1 | Light-green pwdr. |
|  | 115/85 | 4.0 | <5 | Green-brown resin |
|  | 33/15 | 1.6 | 96 | Essential oil |
|  | " | 4.5 | — | Aqueous extract |
| Sage | 320/90 | 1.5 | <1 | Light-green pwdr. |
|  | 120/85 | 3.7 | <5 | Green-brown resin |
|  | 34/14 | 2.0 | 100 | Essential oil |
|  | " | 5.0 | — | Aqueous extract |
| Coriander | 300/80 | 2.4 | <1 | Dark liquid resin |
|  | 115/88 | 17.6 | <5 | Vegetable oil |
|  | 30/12 | .5 | 94 | Essential oil |
|  | " | 4.5 | — | Aqueous extract |
| Capsicum | 300/98 | 6.7 | — | 1.5% capsaicin |
|  | 165/97 | 5.0 | — | 1.9% capsaicin |
|  | 33/12 | .5 | — | 3.7% capsaicin |
|  | " | 3.6 | — | Aqueous extract |

The increased yields, especially of heavy oleoresin components, the greater loadings and hence increased

| (B) Two-way Fractionation | | | | |
|---|---|---|---|---|
| Spice | Pressure/Temp. bar/°C. | Yield (wt. %) | Essential Oil (ml/100 gm) | Product |
| Cloves | 180/90 | 5.2 | <5 | Dark oil/resin |
|  | 34/16 | 16.3 | 104 | Essential oil |
|  | " | 5.2 | — | Aqueous extract |
| Cardamom | 165/85 | 4.0 | <5 | light oil/resin |
|  | 35/12 | 2.0 | 99 | essential oil |
|  | " | 1.2 | — | aqueous extract |
| Allspice | 150/85 | 5.1 | <5 | light oil/resin |
|  | 34/12 | 3.5 | 95 | Essential oil |
|  | " | 3.5 | — | Aqueous extract |
| Vanilla Bean | 165/88 | 10.0 | — | Oil (2% vanillin) |
|  | 34/12 | 2.5 | — | Paste (55% Van.) |
|  | " | 7.5 | — | Water (1.3% Van.) |
| Turmeric | 165/80 | 4.1 | <5 | Pink liquid resin |
|  | 32/10 | 1.5 | 101 | Essential oil |
|  | " | 3.2 | — | Aqueous extract |

-continued

(B) Two-way Fractionation

| Spice | Pressure/Temp. bar/°C. | Yield (wt. %) | Essential Oil (ml/100 gm) | Product |
|---|---|---|---|---|
| Paprika | 180/90 | 2.2 | — | 3600 ASTA |
|  | 34/18 | 5.5 | — | 750 ASTA |
|  | " | 3.3 | — | Aqueous extract |

It is clear that high purity essential oils, typically in excess of 95 ml steam volatile oil per 100 grams, are obtained under the process fractionation conditions. Concomitantly, oleoresin fractions are stripped of their volatile oil components to less than 5 ml/100 gm. Where three-way fractionation is desired, low triglyceride/high resin fractions are easily separated. The specified high fractionation temperature range (>80° C.) for the fixed oil fractions also successfully creates the conditions allowing the easy withdrawal and recovery of resins which are normally in solid to semisolid form at lower temperatures, such as, for example, the resins of pepper, ginger, and cinnamon. Active ingredients, such as vanillin (vanilla bean), capsaicin (capsicum) and the carotinoid pigment ASTA color value (paprika) are typically fractionated and concentrated.

Quality

Samples of fractions and recombined complete oleoresins supplied to international flavor and food ingredient companies were evaluated as being of the highest quality especially in the flavor and aroma capacities of the fractions to reflect the profile of the original spice. Sage, vanilla, pepper, celery, ginger and cinnamon samples, for example, were rated by several companies as the finest oleoresins of those spices they had experienced. All evaluating companies made use of the fractions to reformulate proprietary products for specific applications, and all confirmed that their preferences would be to purchase oleoresins in the fractionated form as supplied from the present process.

This invention is a new and improved process for the supercritical fluid carbon dioxide extraction and fractionation of ground spices. The process consists of using supercritical carbon dioxide fluid under specific pressure and temperature parameters to achieve unexpected extraction efficiencies, yields and purity of oleoresin fractions. Additionally, the process provides partial sterilization of the spice extracts and the residual spice material.

Various modifications and equivalents will be apparent to those skilled in the art and such modifications may be made in the process and procedures of the present invention without departing from the spirit and scope thereof. It is, therefore, to be understood that the invention is to be limited only by the full scope which can be legally attributed to the appended claims.

We claim:

1. A process for extracting a spice to obtain oleoresin and at least one fractionation product of said oleoresin, comprising:
    grinding the spice to a fineness where about 75% of the ground spice passes through a 30 mesh screen;
    extracting the ground spice with supercritical fluid carbon dioxide under conditions effective to extract oleoresin from the spice, said conditions comprising a pressure of from about 400 bar to about 600 bar and a temperature of from about 80° C. to about 120° C.; and
    precipitating at least one oleoresin fraction from the supercritical fluid under conditions effective to precipitate said fraction from the fluid, said conditions comprising a precipitation under a pressure of from about 280 bar to about 380 bar and a temperature of from about 80° C. to about 100° C. followed by recovery of at least one oleoresin fraction.

2. A process as claimed in claim 1, wherein the extraction conditions comprise a pressure of from about 450 bar to about 550 bar and a temperature of from about 90° C. to about 100° C.

3. A process as claimed in claim 1, wherein the extraction is continuous, being a cascade involving four extraction pressure vessels each being at a different point in the extraction cycle so that the process is conducted continuously.

4. A process as claimed in claim 1, further comprising the precipitation of additional from the supercritical fluid under conditions of a pressure of from about 100 bar to about 200 bar art a temperature of from about 80° C. to about 100° C. to effect the recovery of a first additional oleoresin fraction, and under conditions of a pressure of from about 30 bar to about 50 bar and at a temperature of from about 0° C. to about 30° C. to effect the recovery of a second additional oleoresin fraction, said oleoresin fractions being recovered sequentially.

5. A process as claimed in claim 1, wherein the at least one oleoresin fraction recovered under conditions of a pressure of from about 300 bar to about 350 bar and a temperature of from about 80° C. to about 90° C.

6. A process as claimed in claim 4, wherein the first additional oleoresin fraction is recovered under conditions of a pressure of from about 115 bar to about 180 bar and a temperature of from about 80° C. to about 90° C.

7. A process as claimed in claim 4, wherein the second additional oleoresin fraction is recovered under conditions of a pressure of from about 30 bar to about 35 bar and a temperature of from about 5° C. to about 20° C.

8. A process as claimed in claim 4, wherein the second additional oleoresin fraction comprises essential oil and aqueous juices.

9. A process as claimed in claim 4, wherein the second additional oleoresin fraction comprises essential oil having a purity of at least 95 ml steam volatile oil per 100 gm.

10. A process as claimed in claim 4, wherein the at least one and first additional oleoresin fractions have steam volatile oil components of less than 5 ml per 100 gm.

11. A process as claimed in claim 1, wherein the spice is ground at a temperature of −20° C. or less.

* * * * *